（12）United States Patent
Kanamura et al.

(10) Patent No.: US 9,168,724 B2
(45) Date of Patent: Oct. 27, 2015

(54) METHOD OF LABEL FORMATION

(71) Applicants: CASIO ELECTRONICS MANUFACTURING CO., LTD., Iruma-shi, Saitama-Ken (JP); CASIO COMPUTER CO., LTD., Shibuya-ku, Tokyo (JP)

(72) Inventors: Toshiaki Kanamura, Ome (JP); Masaru Sato, Kodaira (JP)

(73) Assignees: CASIO ELECTRONICS MANUFACTURING CO., LTD., Saitama-Ken (JP); CASIO COMPUTER CO., LTD, Tokyo (JP)

( * ) Notice: Subject to any disclaimer, the term of this patent is extended or adjusted under 35 U.S.C. 154(b) by 126 days.

(21) Appl. No.: 14/031,981

(22) Filed: Sep. 19, 2013

(65) Prior Publication Data
US 2014/0076488 A1   Mar. 20, 2014

(30) Foreign Application Priority Data

Sep. 20, 2012 (JP) .................... 2012-207118
Jun. 14, 2013 (JP) .................... 2013-125637

(51) Int. Cl.
*B29C 65/52* (2006.01)
*B32B 37/12* (2006.01)
*B32B 37/26* (2006.01)
*B32B 38/04* (2006.01)
*B32B 38/10* (2006.01)
*B32B 38/14* (2006.01)
*B32B 37/00* (2006.01)
*G09F 3/04* (2006.01)
*G03G 15/00* (2006.01)

(52) U.S. Cl.
CPC ............ *B32B 37/025* (2013.01); *G09F 3/04* (2013.01); *G03G 15/6591* (2013.01)

(58) Field of Classification Search
CPC .. B32B 37/025; B32B 37/26; B32B 38/0004; B32B 38/14; B32B 38/185; B29C 51/14; B29C 51/16; B29C 65/02; B29C 65/18; G09F 3/02; G09F 3/04; G09F 3/10; G03G 15/6591
USPC .................... 156/250, 267, 277, 289
See application file for complete search history.

(56) References Cited

FOREIGN PATENT DOCUMENTS

| JP | 2007283745 A | * 11/2007 | ............... B31D 1/02 |
| JP | 2010-184470 A | 8/2010 | |
| JP | 2012-108300 A | 6/2012 | |

OTHER PUBLICATIONS

English Abstract of JP 2007-283745 (Mar. 19, 2015).*
Machine translation of JP 2007-283745 (Mar. 19, 2015).*

* cited by examiner

*Primary Examiner* — Sing P Chan
(74) *Attorney, Agent, or Firm* — Holtz, Holtz, Goodman & Chick PC

(57) ABSTRACT

This invention provides a label forming apparatus including a release sheet having a release surface from which an adhered adhesive material is releasable, an adhesive material layer stacked on the release surface of the release sheet, a coat layer stacked on a surface of the adhesive material layer opposite to the release sheet, a label portion having a thermoplastic resin secured to a surface of the coat layer opposite to the adhesive material layer, and an edging portion provided on a surface of the coat layer opposite to the adhesive material layer and having a thermoplastic resin secured to a position spaced apart from the label portion so as to surround the label portion.

15 Claims, 9 Drawing Sheets

METHOD OF LABEL FORMATION

CROSS-REFERENCE TO RELATED APPLICATIONS

This application is based upon and claims the benefit of priority from prior Japanese Patent Applications No. 2012-207118, filed Sep. 20, 2012; and No. 2013-125637, filed Jun. 14, 2013, the entire contents of all of which are incorporated herein by reference.

BACKGROUND OF THE INVENTION

1. Field of the Invention
This invention relates to a method of label formation.
2. Description of the Related Art
There has been known a label with an adhesive material provided on one surface of a printed matter. The label is previously releasably formed on a mount. There has also been known a method of label formation and a label forming apparatus, as used in label manufacturing.

Jpn. Pat. Appln. KOKAI Publication Nos. 2012-108300 and 2010-184470 propose a method of label formation including stacking an adhesive material layer and a coat layer, which prevents an adhesive material from coming off, on a release sheet, transferring toner on to the laminate, and performing hot pressing.

When the label is released from the mount, the coat layer and the adhesive material provided between the label and the release sheet are released together. At this time, since the coat layer is required to be released following the shape of the label, a material such as a polyester resin, which is easily split with a small force, is used.

BRIEF SUMMARY OF THE INVENTION

When a label is formed, thermoplastic resin powder toner is transferred onto a mount to be secured by hot pressing, and, thus, to form the label. FIGS. 8A to 8E show a procedure of forming a label 70 with the use of general label forming apparatus and method of label formation. FIG. 9A is a plan view showing a state in which thermoplastic resin powder toner T is transferred onto a mount 71, and FIG. 9B is a plan view showing release of the label 70. As shown in FIGS. 9A and 9B, on the mount 71 used for the formation of the label 70, an adhesive material layer 73 and a coat layer 74 are previously stacked sequentially on a release sheet 72. In FIG. 8E, a seal 77 in the label 70 is released from the release sheet 72, a coat layer 74A is released integrally with the seal 77, a coat layer 74B remains on the mount 71 upon release, an adhesive material layer 73A is released integrally with the seal 77, and an adhesive material layer 73B remains on the mount 71 upon release. An arbitrary image 76 is printed on the label 70.

In the above method of label formation, the toner T is transferred onto the mount 71 (FIGS. 8B and 9A), followed by hot pressing to form the label 70 (FIG. 8C). After that, any printing is applied onto the label 70 (FIG. 8D). As shown by an arrow Y3 in FIG. 8E, when the seal 77 is released, the coat layer 74A and the adhesive material layer 73A under the label 70 are released integrally with the seal 77.

When the seal 77 is released, the coat layer 74B corresponding to a portion where the label 70 is not transferred remains, as shown in FIGS. 8E and 9B, on the release sheet 72 by being pulled with an adhesive force of the adhesive material layer 73B. Namely, when the label 70 is released, the coat layer 74 is split along an edge of the label 70.

However, when a force pulling the coat layer 74B is small, the coat layer 74B cannot be split along the edge of the label 70, and edge dust 78 may be produced on the released seal 77. FIG. 10A is a cross-sectional view showing the production of the edge dust 78 occurring when the label 70 is released, and FIG. 10B is a plan view showing the production of the edge dust 78. The coat layer 74C and the adhesive material layer 73C of FIG. 10A are provided near the edge of the label 70. As shown in FIGS. 10A and 10B, when the adhesive material layer 73 is formed using an adhesive material having a small adhesive force, and when the release sheet 72 with a release surface having light releasability is used, an adhesive force pulling the coat layer 74 is not sufficient. In this case, as shown by an arrow Y4, when the seal 77 is released, the coat layer 74C and the adhesive material layer 73C near the label edge are released along with the seal 77, and there is a problem that the edge dust 78 is produced.

The present invention provides a method of label formation which can prevent the generation of edge dust.

In order to solve the above problem, a method of label formation according to the invention including transferring, on a mount, which has a release sheet having on its at least one surface a release surface from which an adhered adhesive material is releasable, an adhesive material layer stacked on the release surface, and a coat layer stacked on a surface of the adhesive material layer, which is opposite to a surface on the release sheet side of the adhesive material layer, a thermoplastic resin of a label portion and a thermoplastic resin of an edging portion onto a surface of the coat layer, which is opposite to a surface on the adhesive material layer side of the coat layer, heating the label portion and the edging portion, and securing the thermoplastic resin of the label portion and the thermoplastic resin of the edging portion onto the coat layer.

This invention further provides a method of label formation including transferring, on a mount, which has a release sheet having on its at least one surface a release surface from which an adhered adhesive material is releasable, an adhesive material layer stacked on the release surface, and a coat layer stacked on a surface of the adhesive material layer, which is opposite to a surface on the release sheet side of the adhesive material layer, transferring a first toner of a boundary portion onto a surface opposite to a surface on the adhesive material layer side of the coat layer, transferring a thermoplastic resin of a label portion and a thermoplastic resin of an edging portion onto the surface opposite to the surface on the adhesive material layer side of the coat layer, heating the boundary portion, the label portion, and the edging portion, and securing the first toner of the boundary portion, the thermoplastic resin of the label portion, and the thermoplastic resin of the edging portion onto the coat layer.

DETAILED DESCRIPTION OF THE INVENTION

Figure 1:
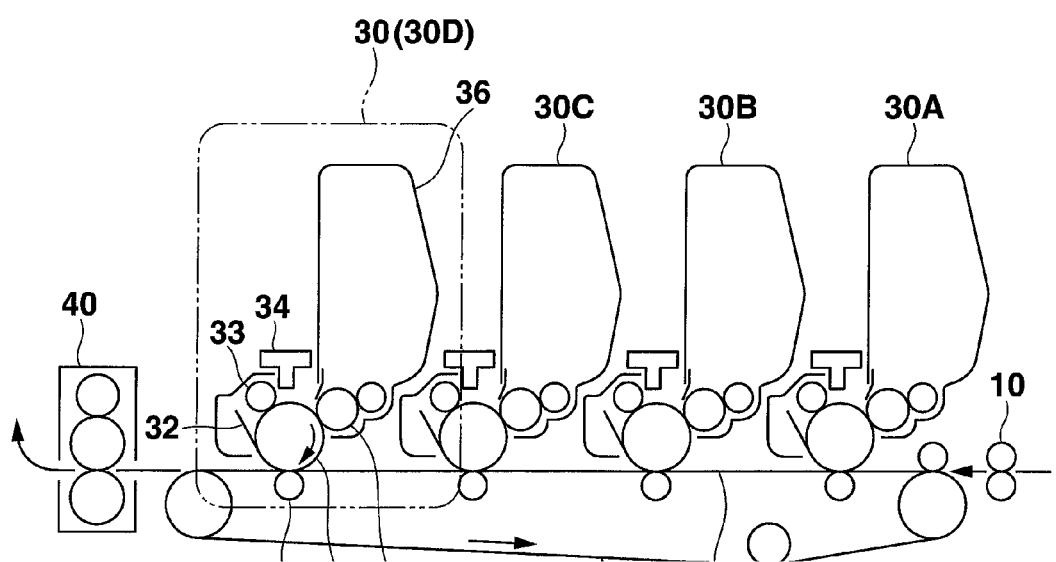
FIG. 1 is an explanatory view showing an internal structure of a label forming apparatus according to a first embodiment of this invention.
Figure 2A:
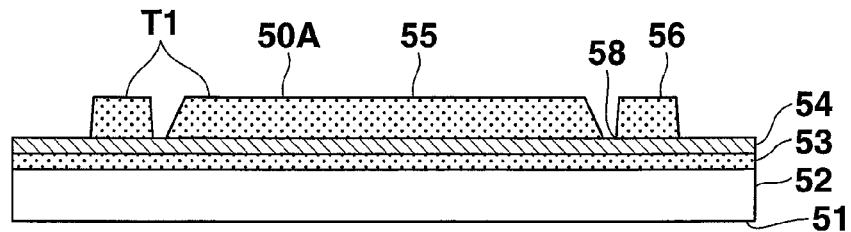
FIG. 2A is a cross-sectional view showing a label after a second process (edging portion transfer process) of a label forming process of forming a label with the use of the label forming apparatus.
Figure 2B:
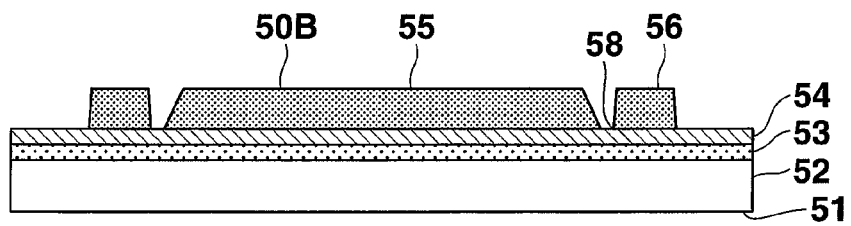
FIG. 2B is a cross-sectional view showing the label after a third process (securing process) of the label forming process.
Figure 2C:
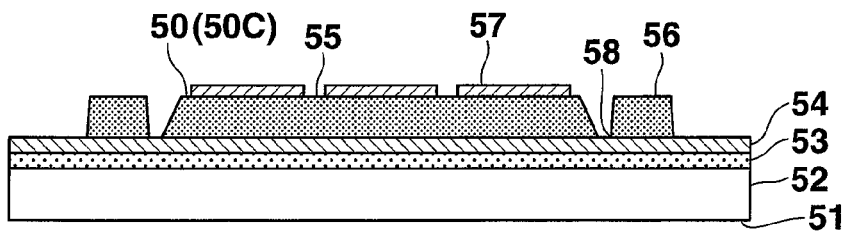
FIG. 2C is a cross-sectional view showing the label after a fourth process of the label forming process.
Figure 2D:
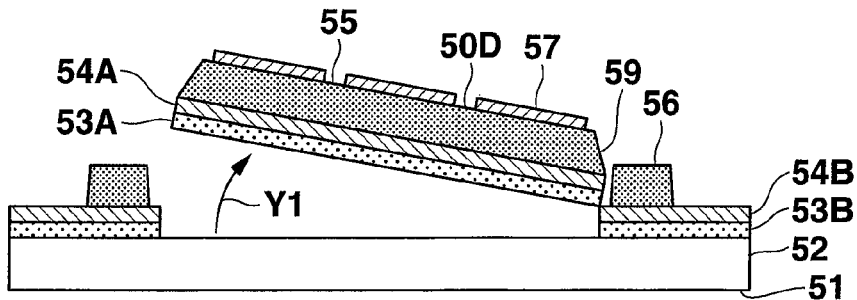
FIG. 2D is a cross-sectional view showing release of a seal from the label after the label forming process.
Figure 3A:
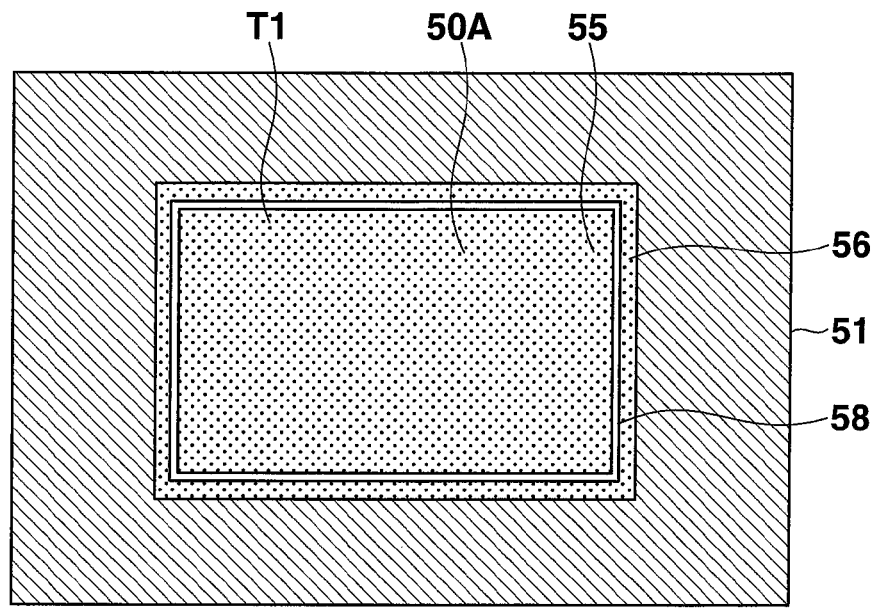
FIG. 3A is a plan view showing the label after the second process of the label forming process.
Figure 3B:
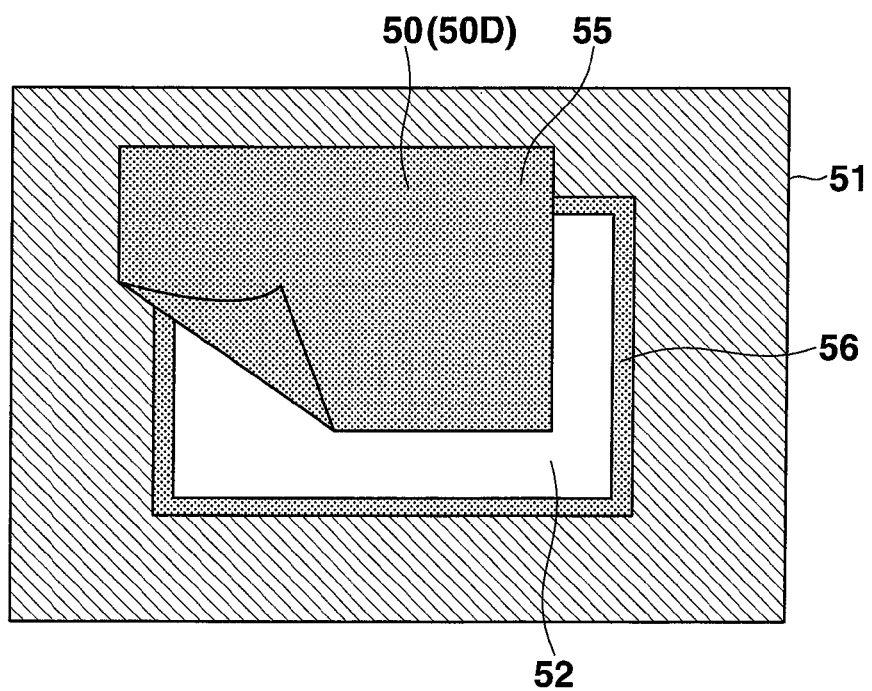
FIG. 3B is a plan view showing release of the seal from the label after the label forming process.

FIG. 1 is an explanatory view showing an internal structure of a label forming apparatus 1 according to a first embodiment of this invention. FIG. 2A is a cross-sectional view showing a label 50A after a second process (edging portion forming process) of a label forming process α forming the label 50 with the use of the label forming apparatus 1. FIG. 2B is a cross-sectional view showing a label 50B after a third process (securing process) of the label forming process α. FIG. 2C is a cross-sectional view showing a label 50C after a fourth process of the label forming process α. FIG. 2D is a cross-sectional view showing release of a seal 59 from a label 50D after the label forming process α. FIG. 3A is a plan view showing the label 50A after the first and second process of the label forming process α. FIG. 3B is a plan view showing release of the seal 59 from the label 50D after the label forming process α. T1 in the drawings is a thermoplastic resin powder toner.

The label forming apparatus 1 includes a mount feeding portion 10 which feeds a mount 51 transferred with the thermoplastic resin powder toner T1 onto its surface and forming a label 50 (50A, 50B, 50C, and 50D), a transfer belt 20 conveying the mount 51, four image forming units 30 (30A, 30B, 30C, and 30D) arranged along the conveyance direction of the transfer belt 20 and transferring powder such as the thermoplastic resin powder toner T1 onto a mount 21, and a fixing device 40 located downstream of the conveyance direction of the transfer belt 20, hot pressing the mount 51 transferred with the thermoplastic resin powder toner T1, and securing the thermoplastic resin powder toner T1 onto the mount 51.

Each of the image forming units 30 has a photosensitive drum 31, a cleaner 32 disposed surrounding a circumferential surface of the photosensitive drum 31 in the circumferential direction, a charging roller 33, an exposure head 34, a development roller 35, a powder tank 36 supplying powder such as the thermoplastic resin powder toner T1 to the development roller 35, and a transfer roller 37 located on a lower surface side of the transfer roller 20, holding the mount 51 between the transfer roller 37 and the photosensitive drum 31, and transferring the powder onto the mount 51.

The photosensitive drum 31 is located on the upper surface side of the transfer belt 20 and rotates in a direction in which the mount 51 is sent to the fixing device 40 (clockwise direction in FIG. 1). A photoreceptor on the surface of the photosensitive drum 31 is charged by a charging roller 33. After that, light is projected on the surface of the charging roller 33 by the exposure head 34 to define a charging portion and a non-charging portion. A powder supplied from the powder tank 36 while being agitated by the rotation of the development roller 35 is adhered onto the surface of the development roller 35. The powder on the development roller 35, charged with static electricity by stirring, is adhered to the non-charging portion on the photosensitive drum 31. After that, the mount 51 is pressed by the photosensitive drum 31 and the transfer roller 37, and the powder is transferred onto the mount 51. After the transfer, extra powder on the surface of the photosensitive drum 31 is removed by the cleaner 32. The image forming unit 30 repeats the process from the charging to the removal of the extra powder and thereby transfers the powder onto the mount 51.

The image forming unit 30 exhibits different functions depending on the powder filled in the powder tank 36 and the shape of a label transferred onto the mount 51. Hereinafter, the four image forming units 30 will be described as the image forming unit 30A, the image forming unit 30B, the image forming unit 30C, and the image forming unit 30D in sequence from the mount feeding portion 10 side.

The label 50 formed by the label forming apparatus 1 has a main label portion 55 to be described later and an edging portion 56. Thus, in the label forming apparatus 1, the thermoplastic resin powder toner T1 forming the main label portion 55 is transferred by the image forming units 30A and 30B, and the thermoplastic resin powder toner T1 forming the edging portion 56 is transferred by the image forming units 30C and 30D. Namely, the image forming units 30A and 30B are used as label portion transfer devices, and the image forming units 30C and 30D are used as edging portion transfer devices.

In the formation of the label 50, the label 50 is formed in accordance with a label forming process α shown below, using the label forming apparatus 1.

The label forming process α includes a first process (label portion transfer process) of transferring the thermoplastic resin powder toner T1 onto the mount 51, a second process (edging portion transfer process) of transferring the thermoplastic resin powder toner T1 at a position spaced apart slightly outward from an outer circumferential portion of the main label portion 55 on a surface of the coat layer 54 opposite to the adhesive material layer 53 so that the thermoplastic resin powder toner T1 surrounds the main label portion 55 and forming the edging portion 56 (FIG. 2A), a third process (securing process) of heating the main label portion 55 and the edging portion 56 and securing the thermoplastic resin powder toner T1 onto the mount 51 (FIG. 2B), and a fourth process of printing a required image 57 onto the main label portion 55 (FIG. 2C).

In the label portion transfer process, the thermoplastic resin powder toner T1 is transferred to a portion released from the mount 51, using the image forming units 30A and 30B, and the main label portion 55 is formed. At this time, the thickness of the main label portion 55 can be varied by adjusting the amount of the thermoplastic resin powder toner T1 transferred by the image forming units 30A and 30B.

In the edging portion transfer process, the thermoplastic resin powder toner T1 is transferred at a position spaced apart slightly outward from the main label portion 55 in a surface direction of the mount 51 so as to surround the main label portion 55, and the edging portion 56 is formed. Namely, a slit portion 58 on which the thermoplastic resin powder toner T1 is not transferred is formed between the main label portion 55 and the edging portion 56.

The label 50 shown below is formed by using the label forming apparatus 1 and the method α of label formation (see, FIG. 2C). Namely, the main label portion 55 and the edging portion 56 are formed on the mount 51 having the adhesive material layer 53 stacked on a release surface of the release sheet 52 and the coat layer 54 stacked on a surface of the adhesive material layer 53 opposite to the release sheet 52. The main label portion 55 has such a required shape that the main label portion 55 is released as a seal 59 (see, FIGS. 2D and 3B) from the release sheet 52, and an image 57 is printed on the surface of the main label portion 55. The edging portion 56 surrounds the main label portion 55, and the slit portion 58 in which the thermoplastic resin powder toner T1 is not transferred and the mount 51 is exposed therethrough is formed between the edging portion 56 and the main label portion 55.

In the label 50 formed as described above, when the seal 59 is released, the adhesive material layer 53A and the coat layer 54A between the main label portion 55 and the release sheet 52 are released along with the seal 59. The edging portion 56 has a function of holding the coat layer 54B and the adhesive material layer 53B provided outside the edge of the main label portion 55. According to this constitution, when the seal 59 is released as shown by an arrow Y1, a force is concentrated on the slit portion 58, and therefore, the coat layer 54 and the adhesive material layer 53 are split along the edge of the main label portion 55. Accordingly, no edge dust remains on the released seal 59.

As described above, according to the label forming apparatus 1 and the method α of label formation according to this embodiment, the edging portion 56 holding the adhesive material layer 53 and the coat layer 54 is formed outside the main label portion 55, whereby the generation of edge dust can be prevented.

In the label forming apparatus 1, although the image forming units 30A and 30B are used as the label portion transfer devices, this invention is applicable when either of the image forming units is used as the label portion transfer device. When the main label portion 55 and the edging portion 56 are transferred by the single image forming unit 30, and when the edging portion 56 is transferred first, an effect similar to the above can be obtained.

In the label 50, the coat layer 54 can be split along the label edge as long as the label 50 has such a shape that a force is concentrated on the slit portion 58. Accordingly, even if the slit portion 58 has such a shape that the mount 51 is intermittently exposed through the slit portion 58, an effect similar to the above can be obtained.

As described above, according to the label forming apparatus, the method of label formation, and the label according to this invention, the generation of edge dust around the label edge can be prevented.

Figure 4A:
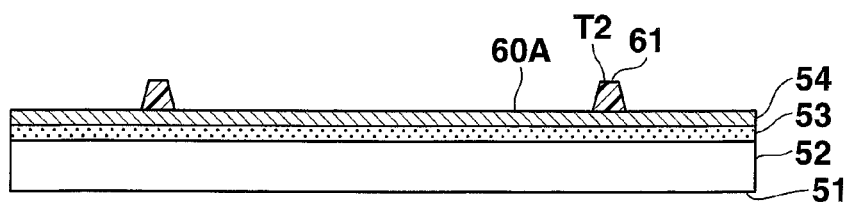
FIG. 4A is a cross-sectional view showing a label after a first process (boundary portion transfer process) of a label forming process according to a second embodiment of this invention.
Figure 4B:
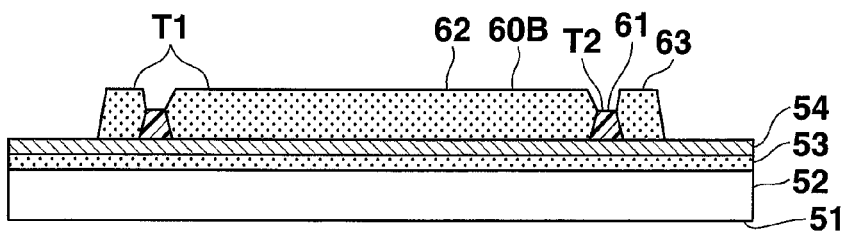
FIG. 4B is a cross-sectional view showing the label after a third process (edging portion transfer process) of the label forming process.
Figure 4C:
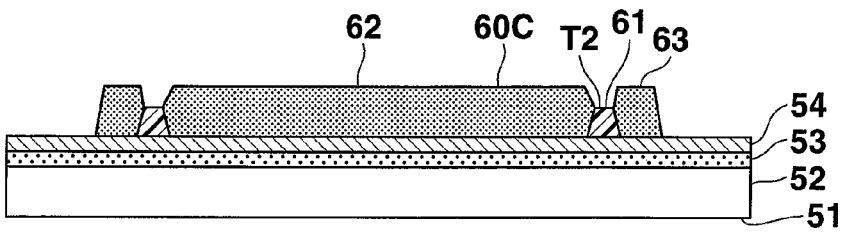
FIG. 4C is a cross-sectional view showing the label after a fourth process (securing process) of the label forming process.
Figure 4D:
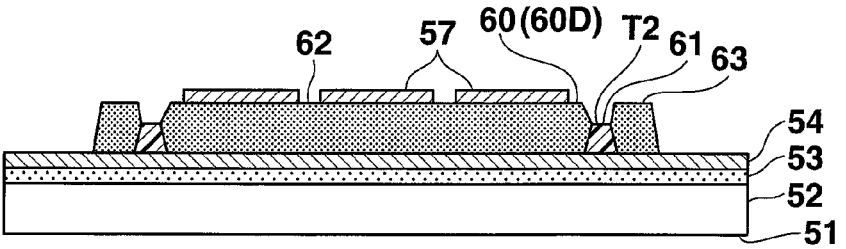
FIG. 4D is a cross-sectional view showing the label after a fifth process of the label forming process.
Figure 4E:
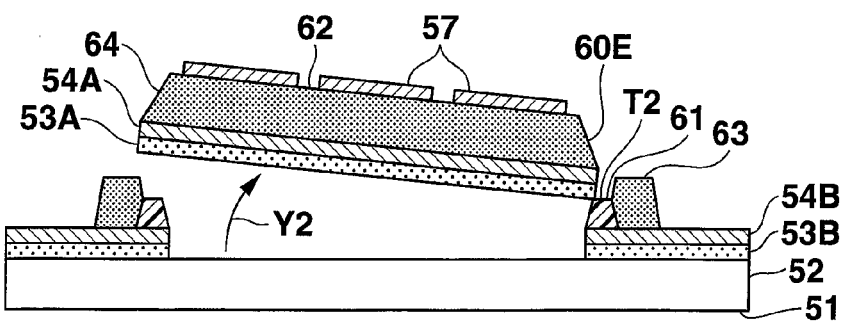
FIG. 4E is a cross-sectional view showing release of a seal from the label after the label forming process.
Figure 5A:
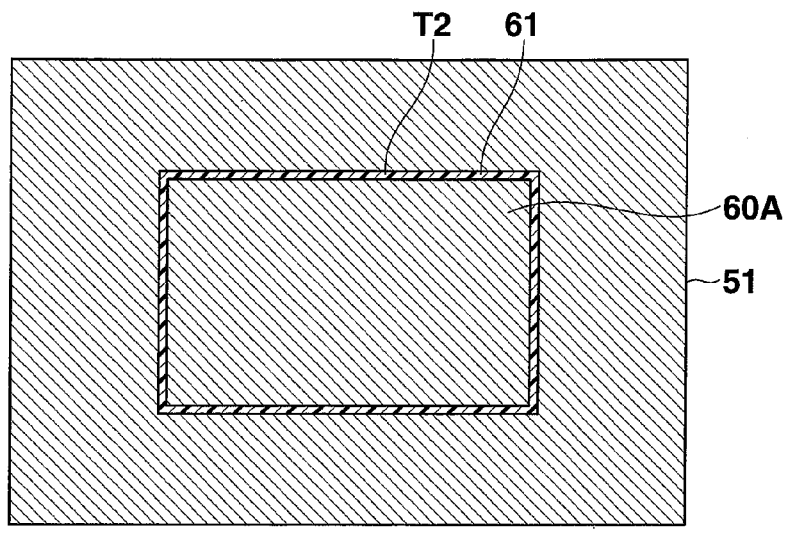
FIG. 5A is a plan view showing the label after a first process of the label forming process.
Figure 5B:
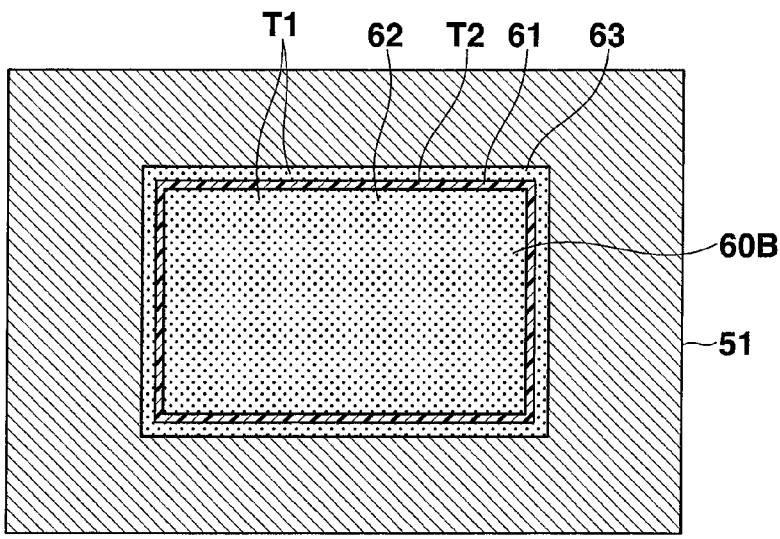
FIG. 5B is a plan view showing the label after a third process of the label forming process.
Figure 5C:
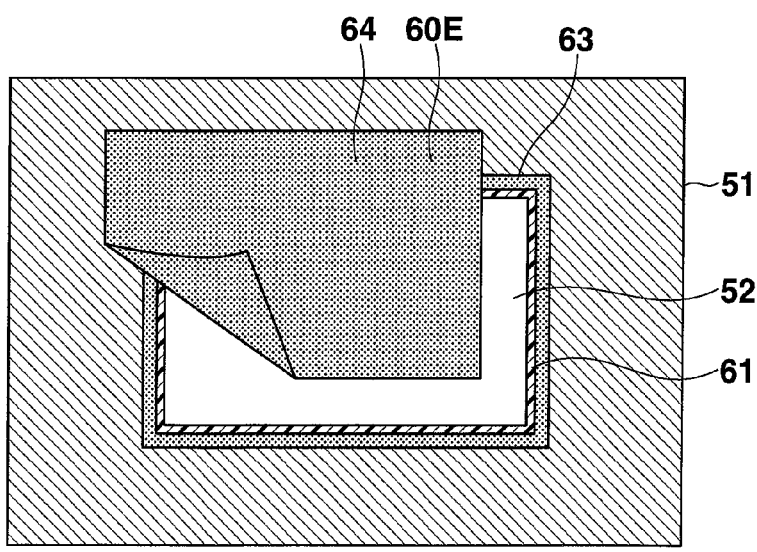
FIG. 5C is a plan view showing release of a seal from the label after the label forming process.

FIG. 4A is a cross-sectional view showing a label 60A after a first process (boundary portion transfer process) of a label forming process β for forming the label 60A with the use of a label forming apparatus 1A. FIG. 4B is a cross-sectional view showing a label 60B after a third process (edging portion transfer process) of the label forming process β. FIG. 4C is a cross-sectional view showing a label 60C after a fourth process (securing process) of the label forming process β. FIG. 4D is a cross-sectional view showing a label 60D after a fifth process of the label forming process β. FIG. 4E is a cross-sectional view showing release of a seal 64 from a label 60E after the label forming process β. FIG. 5A is a plan view showing the label 60A after the first process of the label forming process β. FIG. 5B is a plan view showing a label 60B after a third process of the label forming process β. FIG. 5C is a plan view showing release of a seal 64 from a label 60E after the label forming process β. In FIGS. 4A to 4E and 5A to 5C, the same functional portions as in FIGS. 2A to 2D, 3A and 3B are indicated by the same reference numerals, and a detailed description thereof will be omitted.

The label forming apparatus 1A has a configuration similar to that of the label forming apparatus 1, and the respective functions of image forming units 30A, 30B, 30C, and 30D are different from those in the label forming apparatus 1A. In the label forming apparatus 1A, the image forming unit 30A transfers a boundary portion 61 to be described later. The image forming units 30B and 30C transfer a main transfer portion 62, and the image forming unit 30D transfers an edging portion 63.

In the label forming process β according to this embodiment, the label 60 is formed as follows, using the label forming apparatus 1A.

The label forming process β includes a first process (boundary portion transfer process) of transferring powder toner T2 onto a mount 51 and forming the boundary portion 61 provided on the mount and surrounding a portion to be released after formation of a label (FIG. 4A), a second process (label portion transfer process) of transferring thermoplastic resin powder toner T1 to a portion surrounded by the boundary portion 61 on the mount and forming a main label portion 62, a third process (edging portion transfer process) of transferring the thermoplastic resin powder toner T1 to the outside of the boundary portion 61 on the mount and forming an edging portion 63 surrounding the main label portion 62 and the boundary portion 61 (FIG. 4B), a fourth process (securing process) of heating the main label portion 62, the edging portion 63, and the boundary portion 61 and securing the thermoplastic resin powder toner T1 and the powder toner T2 onto the coat layer 54 (FIG. 4C), and a fifth process of printing a required image 57 on the main label portion 62 (FIG. 4D).

The label 60 shown below is formed, using the label forming apparatus 1A and the method β of label formation (see, FIG. 4D). Namely, the boundary portion 61 surrounding a portion having a required shape to be released from the release sheet 52 is formed on the mount 51. The main label portion 62 is formed at a portion surrounded by the boundary portion 61 on the mount 51, and the edging portion 63 is formed outside the boundary portion 61. As described above, the main label portion 62 has, at its portion surrounded by the boundary portion 61, a portion having a required shape released as a seal 64 from the mount, and an image 57 is printed on the surface of the main label portion 62.

In the label 60 formed described above, when the seal 64 is released, the adhesive material layer 53A and the coat layer 54A between the main label portion 62 and the release sheet 52 are released integrally with the seal 64. The edging portion 63 and the boundary portion 61 have a function of holding the coat layer 54B and the adhesive material layer 53B provided outside the edge of the main label portion 62. According to this constitution, when the seal 64 is released as shown by an arrow Y2, a force is concentrated between the main label portion 62 and the boundary portion 61, and therefore, the coat layer 54 and the adhesive material layer 53 are split along the edge of the main label portion 62. Accordingly, no edge dust remains on the released seal 64.

As described above, according to the label forming apparatus 1A and the method β of label formation according to this embodiment, the boundary portion 61 and the edging portion 63 holding the adhesive material layer 53 and the coat layer 54 are formed outside the main label portion 62, whereby the generation of edge dust can be prevented.

In the label forming apparatus 1A, although the image forming units 30B and 30A are used as the label portion transfer devices, this invention is applicable when either of the image forming units is used as the label portion transfer device. When the main label portion 62 and the edging portion 63 are transferred by the single image forming unit 30, and when the edging portion 63 is transferred prior to the main label portion 62, an effect similar to the above can be obtained.

In the label 60, the coat layer 54 can be split along the label edge as long as the label 60 has such a shape that a force is concentrated between the main label portion 62 and the boundary portion 61. Accordingly, even if the boundary portion 61 has such a shape that the mount 51 is intermittently exposed through the boundary portion 61, an effect similar to the above can be obtained.

As described above, according to the label forming apparatus, the method of label formation, and the label according to this invention, the generation of edge dust around the label edge can be prevented.

Figure 6:
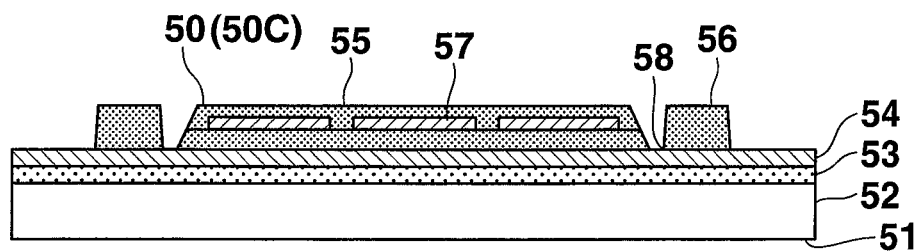
FIG. 6 is a cross-sectional view showing one example of a label formed by the label forming process.
Figure 7:
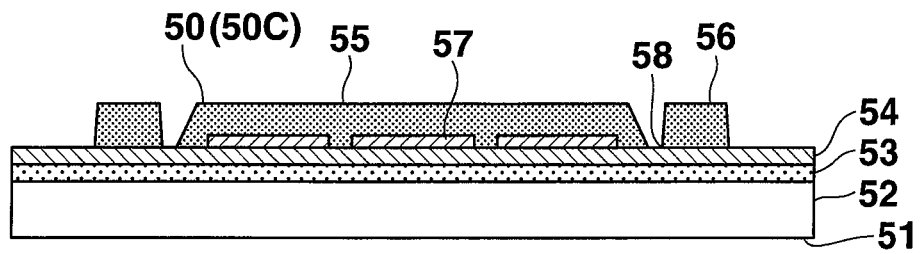
FIG. 7 is a cross-sectional view showing one example of a label formed by the label forming process.
Figure 8A:
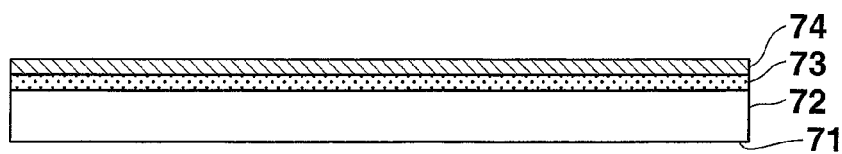
FIG. 8A is a cross-sectional view showing a label after a first process of a label forming process of forming the label with the use of a general label forming apparatus.
Figure 8B:
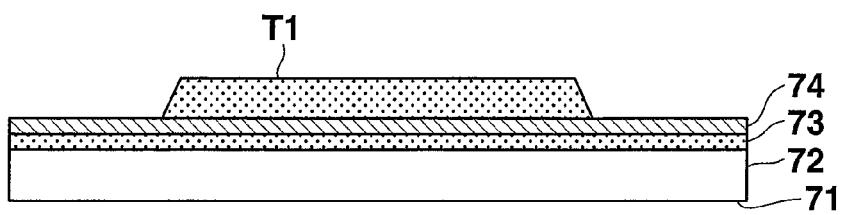
FIG. 8B is a cross-sectional view showing the label after a second process of the label forming process.
Figure 8C:
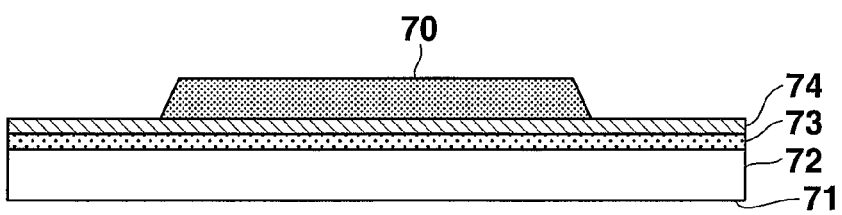
FIG. 8C is a cross-sectional view showing the label after a third process of the label forming process.
Figure 8D:
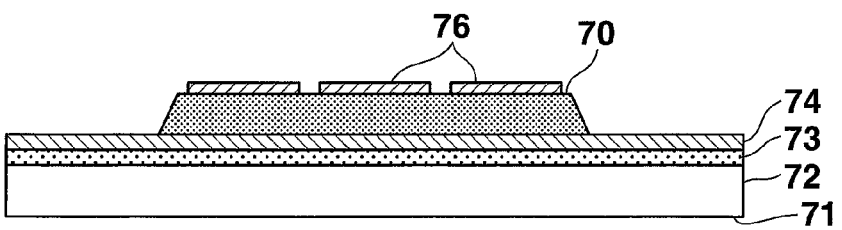
FIG. 8D is a cross-sectional view showing the label after a fourth process of the label forming process.
Figure 8E:
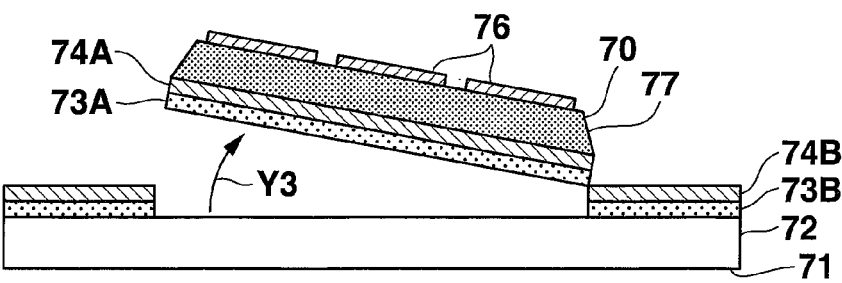
FIG. 8E is a cross-sectional view showing release of a seal from the label after the label forming process.
Figure 9A:
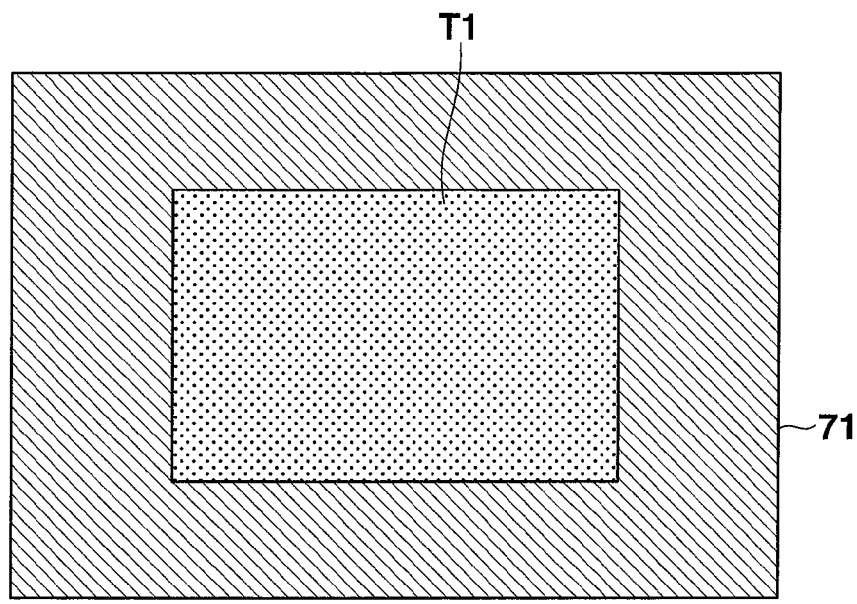
FIG. 9A is a plan view showing a label after a second process of the label forming process.
Figure 9B:
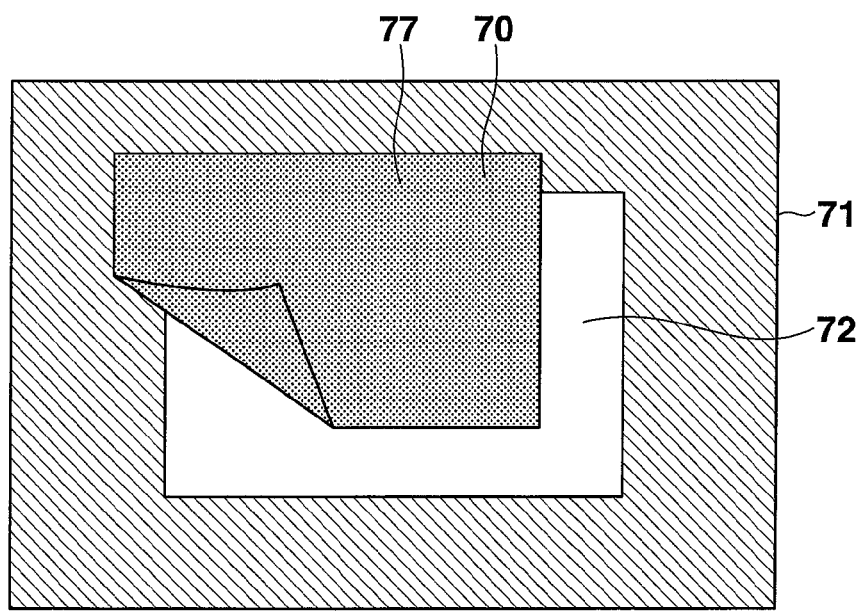
FIG. 9B is a plan view showing release of a seal from the label after the label forming process.
Figure 10A:
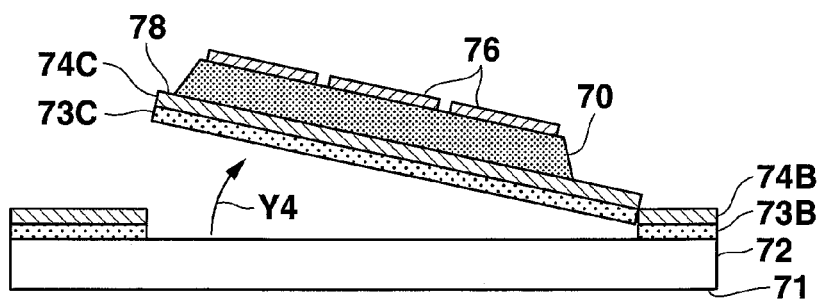
FIG. 10A is a cross-sectional view showing the generation of edge dust occurring when the seal is released from the label after the label forming process.
Figure 10B:
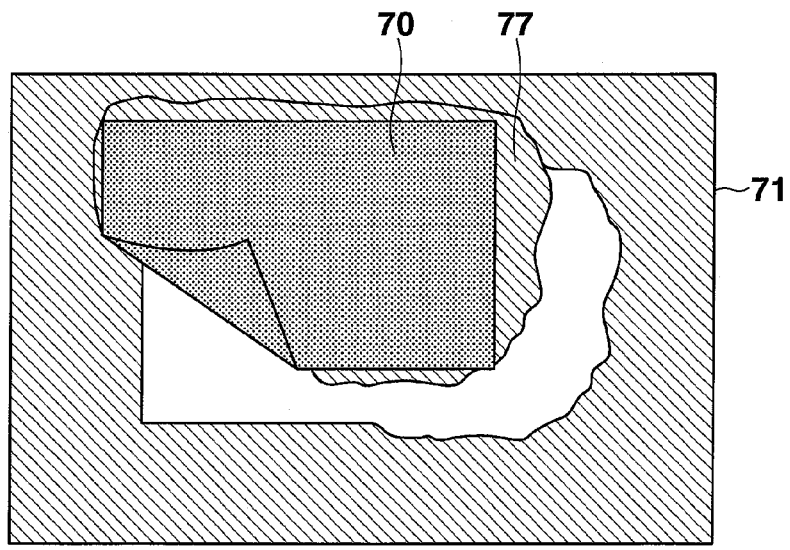
FIG. 10B is a plan view showing the generation of edge dust occurring when the seal is released from the label after the label forming process.

This invention is not limited to the above embodiments. For example, although the foregoing examples have described the invention in the cases where an image is printed on a label, the invention is naturally applicable to other cases, e.g. where an image is printed during transfer of the label to be included in the label (FIG. 6) or where an image is printed before transfer of the label to be positioned between the label and the coat layer (FIG. 7). Moreover, it will be understood that this invention can be variously modified and practiced without departing from the gist of the invention.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A method of label formation comprising:
transferring, on a mount which comprises (i) a release sheet having a release surface from which an adhered adhesive material is releasable, (ii) an adhesive material layer provided on the release surface, and (iii) a coat layer provided on the adhesive material layer, a thermoplastic resin of a label portion and a thermoplastic resin of an edging portion onto a surface of the coat layer such that the edging portion is spaced apart from the label portion by a predetermined dimension, wherein the edging portion has a shape surrounding at least a portion of the label portion; and
heating the label portion and the edging portion and securing the thermoplastic resin of the label portion and the thermoplastic resin of the edging portion onto the coat layer.

2. The method according to claim 1, wherein each of the thermoplastic resin of the label portion and the thermoplastic resin of the edging portion comprises at least one kind of thermoplastic resin.

3. The method according to claim 1, wherein a thickness of the label portion is adjustable by transferring and stacking one or more layers of the thermoplastic resin of the label portion.

4. The method according to claim 1, wherein each of the thermoplastic resin of the label portion and the thermoplastic resin of the edging portion comprises a thermoplastic toner.

5. The method according to claim 1, further comprising:
transferring a toner of an image portion, which becomes a pattern of the label portion, after transferring the thermoplastic resin of the label portion; and
forming the image portion on a surface of the label portion.

6. The method according to claim 1, further comprising:
transferring a toner of an image portion, which becomes a pattern of the label portion, before transferring the thermoplastic resin of the label portion; and
forming the image portion between the label portion and the coat layer.

7. The method according to claim 1, further comprising:
transferring a toner of an image portion, which becomes a pattern of the label portion, between layers when a plurality of layers of the thermoplastic resin of the label portion are transferred; and
forming the image portion inside the thermoplastic resin of the label portion.

8. A method of label formation comprising:
transferring, on a mount which comprises (i) a release sheet having a release surface from which an adhered adhesive material is releasable, (ii) an adhesive material layer provided on the release surface, and (iii) a coat layer provided on the adhesive material layer, a first toner of a boundary portion onto a surface of the coat layer;
transferring a thermoplastic resin of a label portion and a thermoplastic resin of an edging portion onto the surface of the coat layer such that the label portion and the edging portion are spaced apart from each other by a predetermined dimension by the boundary portion, wherein the boundary portion has a shape surrounding at least a portion of the label portion; and
heating the boundary portion, the label portion, and the edging portion and securing the first toner of the boundary portion, the thermoplastic resin of the label portion, and the thermoplastic resin of the edging portion onto the coat layer.

9. The method according to claim 8, wherein each of the thermoplastic resin of the label portion and the thermoplastic resin of the edging portion comprises at least one kind of thermoplastic resin.

10. The method according to claim 8, wherein a thickness of the label portion is adjustable by transferring and stacking one or more layers of the thermoplastic resin of the label portion.

11. The method according to claim 8, wherein each of the thermoplastic resin of the label portion and the thermoplastic resin of the edging portion comprises a thermoplastic toner.

12. The method according to claim 8, wherein each of (i) the first toner of the boundary portion and (ii) a second toner of an image portion which becomes a pattern of the label portion comprises at least one kind of and at least one color of powder toner.

13. The method according to claim 8, further comprising:
transferring a toner of an image portion, which becomes a pattern of the label portion, after transferring the thermoplastic resin of the label portion; and
forming the image portion on a surface of the label portion.

14. The method according to claim 8, further comprising:
transferring a toner of an image portion, which becomes a pattern of the label portion, before transferring the thermoplastic resin of the label portion; and
forming the image portion between the label portion and the coat layer.

15. The method according to claim 8, further comprising:
transferring a toner of an image portion, which becomes a pattern of the label portion, between layers when a plurality of layers of the thermoplastic resin of the label portion are transferred; and
forming the image portion inside the thermoplastic resin of the label portion.

* * * * *